United States Patent
Shem et al.

(10) Patent No.: US 9,912,896 B2
(45) Date of Patent: Mar. 6, 2018

(54) LATCH BASED PARALLEL-TO-SERIAL READOUT CIRCUITRY AND IMAGE SENSOR UTILIZING THE CIRCUITRY

(71) Applicant: Sony Semiconductor Solutions Corporation, Kanagawa (JP)

(72) Inventors: Ariel Ben Shem, Ramat Hasharon (IL); Zvika Veig, Ness-Ziona (IL)

(73) Assignee: Sony Semiconductor Solutions Corporation, Kanagawa (JP)

( * ) Notice: Subject to any disclaimer, the term of this patent is extended or adjusted under 35 U.S.C. 154(b) by 9 days.

(21) Appl. No.: 14/877,141

(22) Filed: Oct. 7, 2015

(65) Prior Publication Data

US 2017/0104948 A1   Apr. 13, 2017

(51) Int. Cl.
H04N 5/378   (2011.01)
H04N 5/374   (2011.01)
H04N 5/369   (2011.01)

(52) U.S. Cl.
CPC ........... *H04N 5/378* (2013.01); *H04N 5/3698* (2013.01); *H04N 5/3741* (2013.01)

(58) Field of Classification Search
CPC ..... H04N 5/378; H04N 5/3698; H04N 5/3741
See application file for complete search history.

(56) References Cited

U.S. PATENT DOCUMENTS

| | | | | |
|---|---|---|---|---|
| 6,169,501 B1 * | 1/2001 | Ryan | ............... | H03M 9/00 341/100 |
| 2004/0085446 A1 * | 5/2004 | Park | ............... | H04N 7/1675 348/143 |
| 2015/0032952 A1 * | 1/2015 | Riley | ............... | G11C 7/1018 711/109 |
| 2016/0381315 A1 * | 12/2016 | Hagihara | ............... | H04N 5/378 348/300 |

* cited by examiner

*Primary Examiner* — Hung Lam
(74) *Attorney, Agent, or Firm* — Michael Best & Friedrich LLP

(57) ABSTRACT

A latch-based parallel to serial readout circuitry includes latches connected to each other in series and to data inputs in parallel. The latches read in values from the data inputs in parallel, and then output the values serially. A readout control circuitry of the latch-based parallel to serial readout circuitry may cause the latches to read in the values in parallel by switching an active input connection of the latches to the data inputs and enabling the latches simultaneously. The readout control circuitry may cause the latches to readout the values serially by switching an active input connection of the latches to the output of a next latch and sequentially enabling the latches.

22 Claims, 9 Drawing Sheets

| E | D | Q | $\overline{Q}$ |
|---|---|---|---|
| 0 | irrelevant | Qprev | $\overline{Q}$prev |
| 1 | 0 | 0 | 1 |
| 1 | 1 | 1 | 0 |

LATCH BASED PARALLEL-TO-SERIAL READOUT CIRCUITRY AND IMAGE SENSOR UTILIZING THE CIRCUITRY

BACKGROUND

1. Field of the Invention

The present invention relates generally to a parallel-to-serial readout circuitry, and more particularly to a parallel-to-serial readout circuitry that is part of a readout circuit of an image sensor.

2. Description of the Related Art

An image sensor generally includes a readout circuit of some form for reading out pixel signal values from pixels in a pixel array. One form of readout circuit includes multiple Analog to Digital Converters (ADCs) though which analog pixel signal values are read out in parallel and converted into digital form. For example, there may be one ADC provided for each column of the pixel array, and pixel signal values of one row of pixels at a time may be read out in parallel through the ADCs. The output of the ADCs (a series of bits making up digital pixel values) is then read out serially through some form of parallel-to-serial readout circuit. Because the serial readout of the digital pixel values takes a period of time, the parallel-to-serial readout circuit preferably should temporarily store the digital pixel values so that the ADCs can begin converting a next round of pixel signal values without having to wait until all of the previously converted values have been read out serially.

One form of the parallel-to-serial readout circuit used to read out the digital pixel values from the ADCs is a conventional shift register. For example, the output of each ADC may be an input of the shift register. The shift register stores the bits of the pixel values in the flip-flops making up the shift register, and shifts the bits once each clock cycle. The end bit in the register is output each clock cycle, and thus the bits of the digital pixel values are output serially over a number of clock cycles as they are "shifted out" of the register.

Another form of parallel-to-serial readout circuit uses a holding device (e.g., a sample-and-hold circuit) and a tri-state buffer for each bit output by an ADC. The bits of the digital pixel values output by the ADCs are temporarily held by their corresponding holding device, whose output is connected to one of the tri-state buffers. A bus is provided, and the tri-state buffers are controlled such that one buffer drives the bus per clock cycle based on the bit held in the holding device, thus serially reading out a signal on the bus that corresponds to the bits of the digital pixel values held in the holding devices.

SUMMARY

The above-described parallel-to-serial readout circuits (using a conventional shift register or tri-state buffers/bus) require relatively high power consumption and a relatively large layout area. Moreover, the tri-state buffers/bus requires hybrid analog-digital architecture, which is more difficult to implement using standard circuit designing tools. Accordingly, disclosed herein are devices and methods that overcome these and other difficulties.

According to a first exemplary illustration of the present disclosure, a parallel to serial readout circuitry may comprise a plurality of latches connected to each other in series and to a plurality of data inputs in parallel. The parallel to serial readout circuitry may further comprise a readout control circuitry configured to control readout operations of the plurality of latches, which may include causing the plurality of latches to read values from the plurality of data inputs in parallel, and then output the values serially by sequentially enabling each of the plurality of latches.

According to a second exemplary illustration of the present disclosure, a readout circuit may comprise a plurality of ADC blocks that convert a plurality of input analog signals to digital values and output in parallel bits of the digital values, and the parallel to serial readout circuitry of the first exemplary illustration.

According to a third exemplary illustration, an image sensor may comprise a pixel array unit, comprising a plurality of pixels that each include a photoelectric conversion element that converts incident light into an analog pixel signal. The image sensor may further comprise a readout circuit configured to read out the analog pixel signals from the pixel array unit. The readout circuit may comprise a plurality of ADC blocks that convert the analog pixel signals into digital values and output in parallel bits of the digital values, and the parallel to serial readout circuitry of the first exemplary illustration.

According to a fourth exemplary illustration, an electronic apparatus may comprise an optical device that focuses incident light; a pixel array unit, comprising a plurality of pixels that each include a photoelectric conversion element that converts light focused from the optical device into an analog pixel signal, and a readout circuit configured to read out the analog pixel signals from the pixel array unit. The readout circuit may comprise a plurality of ADC blocks that convert the analog pixel signals into digital values and output in parallel bits of the digital values, and the parallel to serial readout circuitry of the first exemplary illustration.

According to a fifth exemplary illustration, a parallel to serial readout circuitry may comprise a plurality of first stage readout circuits and a second stage readout circuit. The plurality of first stage readout circuits may each include a plurality of latches connected to each other in series and to a plurality of data inputs in parallel, and a first-stage readout control circuitry configured to control readout operations of the plurality of latches of the respective first stage readout circuit, including causing the plurality of latches to: read values from the plurality of data inputs in parallel, and then output the values serially by sequentially enabling each of the plurality of latches. The second stage readout circuit may include a plurality of latches connected to each other in series and to output lines of the plurality of first stage readout circuits in parallel, and a second-stage readout control circuitry configured to control readout operations of the plurality of latches of the second stage readout circuit, including causing the plurality of latches to: read values from the output lines of the plurality of first stage readout circuits in parallel, and then output the values serially by sequentially enabling each of the plurality of latches.

According to a six exemplary illustration of the present disclosure, a readout circuit may comprise a plurality of ADC blocks that convert a plurality of input analog signals to digital values and output in parallel bits of the digital values, and the parallel to serial readout circuitry of the fifth exemplary illustration.

According to a seventh exemplary illustration, an image sensor may comprise a pixel array unit, comprising a plurality of pixels that each include a photoelectric conversion element that converts incident light into an analog pixel signal. The image sensor may further comprise a readout circuit configured to read out the analog pixel signals from the pixel array unit. The readout circuit may comprise a plurality of ADC blocks that convert the analog pixel signals into digital values and output in parallel bits of the digital values, and the parallel to serial readout circuitry of the fifth exemplary illustration.

According to an eighth exemplary illustration, an electronic apparatus may comprise an optical device that focuses incident light; a pixel array unit, comprising a plurality of pixels that each include a photoelectric conversion element that converts light focused from the optical device into an analog pixel signal, and a readout circuit configured to read out the analog pixel signals from the pixel array unit. The readout circuit may comprise a plurality of ADC blocks that convert the analog pixel signals into digital values and output in parallel bits of the digital values, and the parallel to serial readout circuitry of the fifth exemplary illustration.

According to an ninth exemplary illustration, a method of controlling a parallel to serial readout circuitry that includes a plurality of latches connected to each other in series and to a plurality of data inputs in parallel is provided. The method may comprise reading values from the plurality of data inputs into the plurality of latches in parallel, by enabling each of the plurality of latches simultaneously. The method may further comprise outputting the values from the plurality of latches serially by sequentially enabling each of the plurality of latches.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

The present disclosure is related to readout circuits comprising latch based parallel-to-serial readout circuits and devices that utilize these readout circuits. The following discussion focuses mainly on examples in which the readout circuits are used in image sensors, but it will be understood that this is merely one example. It will be understood that the disclosed readout circuits can be used in any device in which there is a need to readout more than one signal in parallel and output the signals serially.

[Configuration of Image Sensor]

Figure 1:
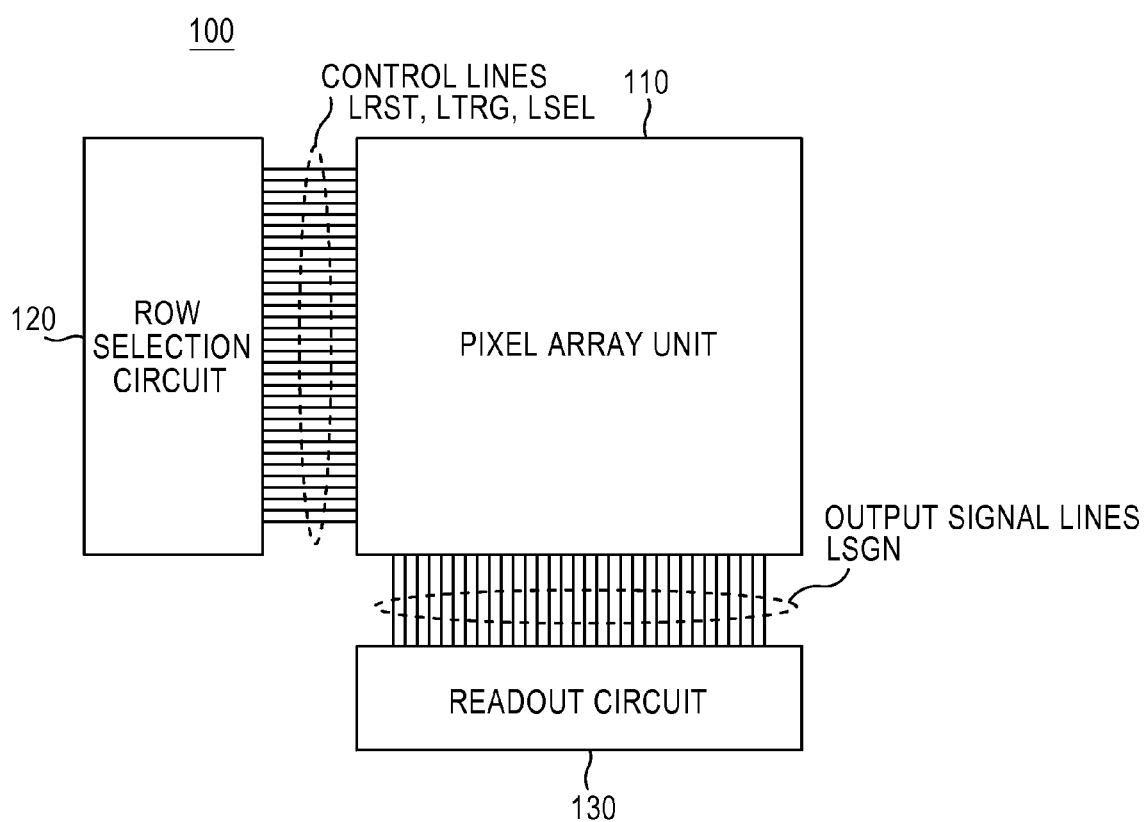
FIG. 1 is a conceptual diagram illustrating an image sensor 100.

FIG. 1 illustrates an image sensor 100 that may utilize the exemplary readout circuits of this disclosure. The image sensor 100 includes a pixel array unit 110, a row selection circuit 120, control lines (e.g., LRST LTRG, LSEL), a readout circuit 130, and output signal lines LSGN. The pixel array unit 110 includes multiple pixels 110A arrayed in a pattern (not illustrated). The row selection circuit 120 may apply control signals to the control lines and thereby control operations of the pixels 110A. Pixel signal values may be readout out from the pixels 110A of the pixel array to the readout circuit 130 through the output signal lines LSGN. The readout circuit 130 may perform various types of signal processing on the pixel signal values, such as error correction, correlated double sampling, and analog-to-digital conversion, and then serially output pixel data based on the processed pixel signal values. Pixel data output by the readout circuit 130 can be subjected to further processing, and ultimately is combined to form image data describing an image that was incident on the pixel array 110 during an exposure period. The readout circuit 130 will be discussed in greater detail below with reference to FIGS. 3-11.

In one embodiment, the pixels 110A are arrayed in a pattern of horizontal rows and vertical columns, the pixels 110A are controlled in units of a row (i.e., an entire row of pixels 110A is selected at the same time) and are read out row-sequentially, and each signal line LSGN corresponds to one column of the pixel array. However, other patterns of arraying the pixels, other scanning methods, and other signal line configurations are all possible. For example, the pixels 110A may be divided into arbitrary groups that each share a signal line LSGN, each Bayer quadrant may share a signal line LSGN, each predetermined area of the pixel array may share a signal line LSGN, multiple columns may share a signal line LSGN, and so on. Indeed, any arbitrary pattern of arraying the pixels, any arbitrary scanning method, and any arbitrary signal line arrangement may be used, as long as at some point in a readout operation more than one pixel signal values are read into the readout circuit 130 in parallel (regardless of from whence in the array 110 the pixel signal values originated).

Figure 2:
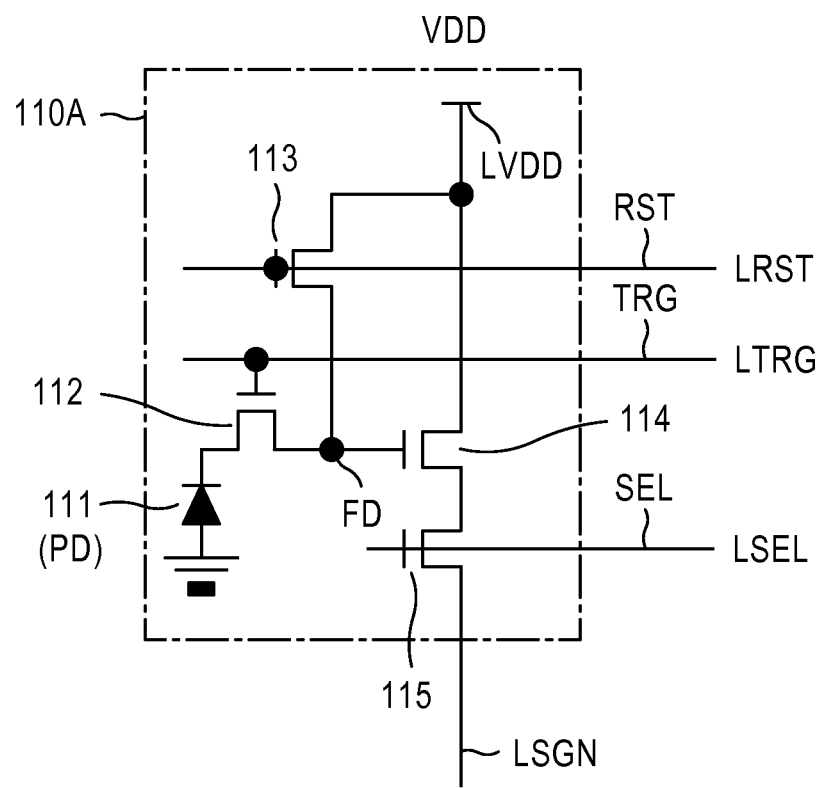
FIG. 2 is a circuit diagram illustrating an exemplary pixel 110A.

FIG. 2 illustrates an exemplary pixel 110A. The pixel 110A may include, for example, a photodiode ("PD") 111, a transfer transistor 112, a floating diffusion ("FD"), a reset transistor 113, an amplifier transistor 114, and a readout transistor 115. The PD converts light into charge during an exposure period, with the amount of charge that is produced being based on the amount of light incidence on the PD during the exposure period (as well as on various sources of noise, such as thermal noise, leakage from adjacent components, etc.). A reset operation, which is described below, may be completed prior to a start of the exposure period. A mechanical shutter operating may begin the exposure period, or the exposure period may begin with an electronic shutter operation (for example, the ending of the reset operation may begin the exposure period). At the end of the exposure period, the charge is transferred to the FD via the transfer transistor 112 under control of the signal TRG applied to the control line LTRG. The FD integrates the charge into a voltage, which is applied to the gate of the amplifier transistor 114. When the readout transistor 115 is turned on by the control signal SEL applied to the control line LSEL, a signal from the amplifier transistor 114 is applied to the output signal line LSGN. The signal from the amplifier transistor 114 is based on the voltage held in the FD, which in turn is based on the amount of charge that was converted by the PD, which is based on the amount of light incident on the PD during the exposure period. Thus, the signal read out to the signal line LSGN (a pixel signal value) is indicative of an amount of light incident on the PD during the exposure period (plus some noise). The pixel signal values read out to the output signal lines LSGN are read into the readout circuit 130 in parallel, from whence they are read out serially as pixel data. After the pixel signal value of the pixel 110A is read out, the aforementioned reset operation may be performed again to reset the pixel for a next exposure period (i.e., a next image frame if the imaging device is capturing video images). The reset operation comprises turning on the reset transistor 113 and the transfer transistor 112 by the control signals RST and TRG, respectively, and thereby clearing out any accumulated charges in the FD and the PD. In addition, a signal (i.e., a reset signal) may be read out from the pixel 110A after performing the reset operation but before charges from the PD are transferred to the FD. This reset signal indicates a reset potential of the FD, and can be used in noise cancellation techniques, such as correlated double sampling.

The above-described pixel 110A is merely exemplary, and it will be understood that various components could be added to, removed from, or rearranged within the pixel 110A as described, and that the operations other than those described above could be performed. For example, additional transistors and storage elements could be included in the pixel 110A to facilitate electronic global shutter operations. As another example, multiple PDs may share a single FD, amplifier transistor 113, and readout transistor 115.

[Configuration of Readout Circuit]

Figure 3:
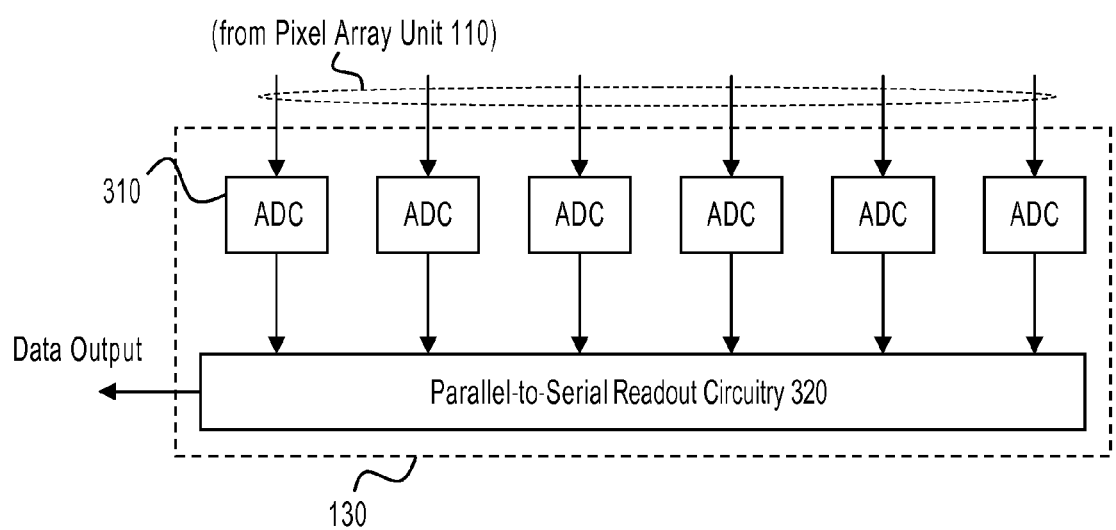
FIG. 3 is a conceptual diagram illustrating readout circuit 130.

FIG. 3 illustrates an example of the readout circuit 130. The exemplary readout circuit 130 includes ADC blocks 310 and a parallel-to-serial readout circuitry 320. The ADC blocks 310 receive pixel signals from the pixel array unit 110, process the pixel signals, and outputs digital pixel values in parallel to the parallel-to-serial readout circuitry 320. The parallel-to-serial readout circuitry 320 reads out the digital pixel values serially. In one embodiment, each ADC block 310 is coupled to one of the signal lines LSGN, and includes an ADC (not illustrated), which converts the analog pixel signal of its corresponding signal line LSGN into digital from (i.e., a digital pixel value). The ADC may be any form of ADC, such as a single slope ADC, an SAR ADC, a pipelined ADC, a Delta-Sigma ADC (also known as Sigma-Delta ADC, $\Delta\Sigma$ADC, or $\Sigma\Delta$ADC).

The digital pixel value output by the ADC may be composed of a predetermined number of bits B that represent the quantized magnitude (voltage) of the sampled analog pixel signal according to any predetermined encoding scheme. In some applications, the B bits of each digital pixel value may be output by the corresponding ADC block 310 in parallel over B output lines (although the figures illustrate only one output of each of the ADC blocks 310 for simplicity). For example, the ADC may output a B-bit binary number over B output lines (one line per bit-location). In other applications, the B bits of each digital pixel value may by output by the corresponding ADC block 310 serially over a single output line. For example, the ADC may output a series of counter pulses, where the number or frequency of pulses represents the quantized magnitude (voltage) of the sampled analog pixel signal. For simplicity, in the examples discussed below it will assumed that the ADCs of the ADC blocks 310 output B-bit binary numbers over B output lines. When the ADC blocks 310 have B output lines, each of the B output lines may be an input of the same parallel-to-serial readout circuitry 320, or alternatively there may be multiple parallel-to-serial readout circuitries 320 provided (e.g., one for each bit of the binary number). For example, a first parallel-to-serial readout circuitry 320 could have as inputs the first-bit output lines of the ADC blocks 310, a second parallel-to-serial readout circuitry 320 could have as inputs the second-bit output lines of the ADC blocks 310, and so on up to a $B^{th}$ parallel-to-serial readout circuitry 320 that could have as inputs the $B^{th}$-bit output lines of the ADC blocks 310.

The ADC of each ADC block 310 may also perform correlated double sampling while converting the pixel signal values to digital form. The ADC blocks 310 may also include additional components beyond the ADC, such as amplifiers, analog correlated double sampling circuits, noise cancelation circuitry, components for coupling the LSGN to the ADC block 310 or coupling the ADC block 310 to the parallel-to-serial readout circuitry 320, and so on.

In addition, although the description above assumes that the function of converting analog pixel signals into digital form is located in the readout circuit 130 (namely, in the ADC blocks 310), other configurations may be used. For example, the ADC function may be provided by a pixel ADC in each pixel (comparator in pixel), in which case the signal output to each signal line LSGN will already be converted to digital form. In such a configuration, the ADC blocks 310 described above may be omitted entirely (if the ADC blocks 310 perform functions other than the ADC function, then these functions could be retained in the ADC blocks 310).

After A/D conversion, bits of the digital pixel values are input in parallel to the parallel-to-serial readout circuitry 320. The parallel-to-serial readout circuitry 320 reads out the input bits of the digital pixel values serially. The parallel-to-serial readout circuitry 320 also temporarily stores the bits of the digital pixel values while they are being read out, which allows the ADC blocks 310 to begin processing a next set of pixel signal values without having to wait until all of the bits of the digital pixel values have been readout out. For example, while bits of the digital pixel values of one row of pixels 110A are being read out by the parallel-to-serial readout circuitry 320, the ADC blocks may begin processing pixel signal values from a next row of pixels 110A.

Although FIG. 3 illustrates a single parallel-to-serial readout circuitry 320 for the entire pixel array 110, it is also possible to have more than one parallel-to-serial readout circuitry 320 for the pixel array 110. For example, the pixel array could be divided into regions and each region could have its own parallel-to-serial readout circuitry 320 that reads out the pixel signal values from pixels 110A in the region. When multiple parallel-to-serial readout circuitries 320 are used, there will be multiple serial bit streams (one bit stream for each parallel-to-serial readout circuitry 320); these bit streams could be multiplexed again by a subsequent parallel-to-serial conversion stage into a single serial output stream before being output for further processing, or the streams may be output in parallel. As another example, when each ADC block 310 has B output lines (one for each bit of each digital pixel value), then B parallel-to-serial readout circuitries 320 could be provided, one for each bit-place. This would allow for simultaneously reading out each bit of a single digital pixel value. However, regardless of where the ADC function is located, how the digital pixel values output by the ADC blocks 310 are formatted, whether bits of the digital pixel value are output serially over a signal output line or in parallel over B output lines, or how many parallel-to-serial readout circuitries 320 provided, a basic condition of the readout cycle of each parallel-to-serial readout circuitry 320 remains essentially the same—namely, multiple bit values are input in parallel to the parallel-to-serial readout circuitry 320 and the parallel-to-serial readout circuitry 320 reads out the bits serially. The number of output lines per ADC block 310 may affect how many parallel-to-serial readout circuitries 320 to include in the readout circuit 130 and/or a number of readout cycles that the parallel-to-serial readout circuitries 320 must go through in order to completely read out a set of digital pixel values from the ADC block 310, but the basic operation of a single readout cycle is the same. Accordingly, the following discussion will focus mainly on the operations of only one parallel-to-serial readout circuitry 320 for the sake of convenience.

[Configuration of First Exemplary Parallel-to-Serial Readout Circuitry]

Figure 4:
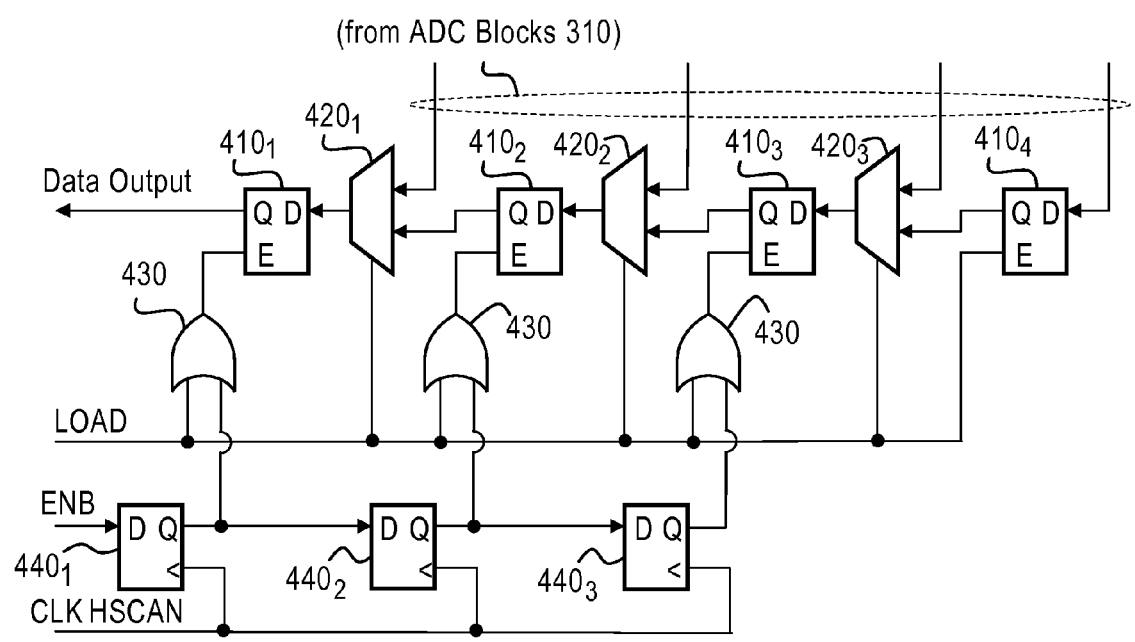
FIG. 4 is a circuit diagram illustrating a first exemplary parallel-to-serial readout circuitry 320.

FIG. 4 illustrates an example of the parallel-to-serial readout circuitry 320. The parallel-to-serial readout circuitry 320 includes latches 410, multiplexors 420, OR gates 430, and flip-flops 440. Each latch 410 (except for the last latch 410) has a corresponding multiplexor 420, a corresponding OR gate, and a corresponding flip-flip 440. There will be one latch 410 provided for each bit output of the ADC blocks 310 that the parallel-to-serial readout circuitry 320 is responsible for outputting serially. For example, if there is only one parallel-to-serial readout circuitry 320 for the entire array and if there is one ADC block 310 per column of pixels 110A, then there will be B*N latches 410 in the parallel-to-serial readout circuitry 320, where B is the number of bits per digital pixel value and N is the number of columns in the pixel array 110. In FIG. 4, only four latches $410_1$ through $410_4$ are illustrated for ease of understanding, but it will be understood that in practice there may be many more latches in each parallel-to-serial readout circuitry 320 (perhaps hundreds or even thousands).

Figures 10, 11:
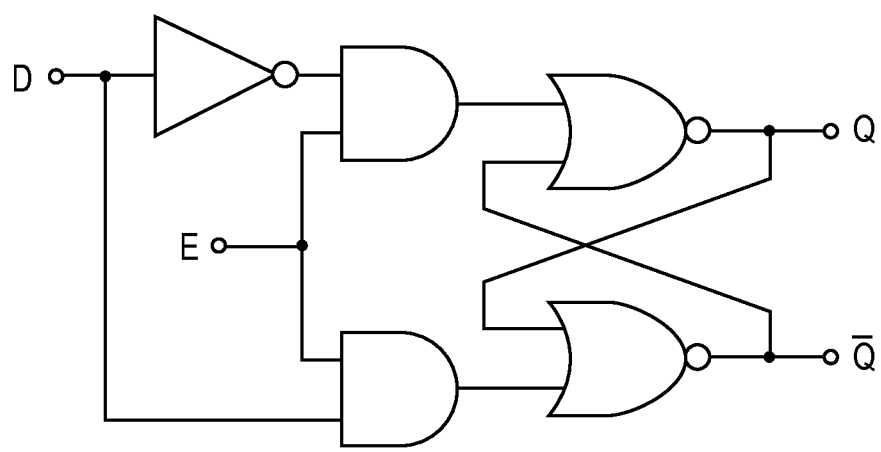
FIG. 10 is a truth table of a latch 410.
FIG. 11 is circuit diagram illustrating an example of the internal makeup of a latch 410.

The latches 410 are D-latches, also known as gated D-latches, transparent latches, data latches, or simply gated latches. The latches 410 have a data input D, an enable input E, and outputs Q and $\overline{Q}$ (where $\overline{Q}$ is always the opposite of Q). The output $\overline{Q}$ of the latches 410 is not relevant to the operations described herein, and thus is not illustrated in the figures. The truth table of the latches 410 is shown in FIG. 10, and an example of how a latch 410 may be constructed is shown in FIG. 11. A property of the latches 410 is that when the enable input E is logical high, the signal at the input D propagates directly through the circuit to the output Q. This means that when the signal at the input D changes, the latch 410 propagates the change to Q essentially immediately (i.e., without waiting for a next clock cycle). This is in contrast to a flip-flop, which would propagate the change at D only when the next clock pulse arrives. Furthermore, when the enable input E is logical low, the output Q remains the same value that it was immediately before the input E switched to low (regardless of whether the input E subsequently changes).

The latches 410 are connected in series to each other. Specifically, the data input D of each latch 410 (except the last latch 410) is connected to the output Q of the next latch 410 (via the multiplexors 420). The latches 410 are also connected to output lines from the ADC blocks 310. Specifically, the data input D of each latch 410 is connected to a corresponding output line from the ADC blocks 310 (via multiplexors 410). Thus, the latches 410 are connected both to each other (in series) and to the ADC blocks 310 (in parallel). As discussed below, the multiplexors 420 select which of these connections of the latches 410 will be the active connection (i.e., whether the latch 410 will be electrically connected to the signal from the ADC blocks 310 or to the signal from the next latch 410).

The multiplexors 420 each have data two input terminals, a control terminal, and an output terminal. The multiplexors 420 act as a switch, switching between the two input terminals based on the signal of the control terminal. In the parallel-to-serial readout circuitry 320 shown in FIG. 4, the output of the multiplexors 420 is connected to the data input D of the corresponding latch 410, one input terminal receives a bit output from the ADC blocks 310, the other input terminal receives the output Q of the next latch 410, and the control terminal is connected to the signal LOAD. Thus, when LOAD is logical high, the bit outputs from the ADC blocks 310 are applied by the multiplexors 420 to the data inputs D of the latches 410, and when LOAD is logical low, the output Q of a next latch 410 is applied by the multiplexors 420 to the data input D of each latch 410. In other words, the multiplexors 420 select which connection of their corresponding latch 410—the connection to the corresponding output of the ADC blocks 310 or the connection to the output of the next latch 410—will be the active (i.e., electrically connected) connection. As will be discussed in greater detail below, the multiplexors 420 select the output of the ADC blocks 310 during an initial read-down portion of a readout operation, and select the output of the latches 410 during essentially the rest of the readout operation.

In the parallel-to-serial readout circuitry 320 shown in FIG. 4, the output of each OR gate 430 is connected to the enable input E of the corresponding latch 410. The signal LOAD is applied to one of the inputs of each OR Gate 430, and the other input of each OR gate 430 is connected to the data output Q of the corresponding flip-flop 440. Thus, the latches 410 are enabled whenever either LOAD is logical high, or when the output Q of the corresponding flip-flop is logical high.

The flip-flops 440 have a data input D, an enable input E, a clock input (shown by the symbol "<" in the Figure), a set input, a reset input, and outputs Q and $\overline{Q}$ (where $\overline{Q}$ is always the opposite of Q). The set and reset inputs and the output $\overline{Q}$ are not illustrated in FIG. 4. The flip-flops 440 change the value of their output Q only at a definite portion of the clock cycle (for example, at the rising edge of each clock pulse). At such clock timings, the output Q of the flip-flop is set to the same value that the input D has at the clock timing, and this value is maintained until the next clock timing (even if the value of the input D changes in between clock timings). In FIG. 4, the first flip-flop $440_1$ has its input D connected to the signal ENB, while each of the other flip-flops 440 has its input D connected to the output Q of the previous flip-flop 440. The clock input of each flip-flop 400 is connected to the clock signal $CLK_{HSCAN}$.

The control signals LOAD and ENB and the clock signal $CLK_{HSCAN}$ may be generated by one or more circuits (not illustrated) configured to generate pulses at the appropriate timings (discussed below). These one or more circuits will be referred to collectively as a control circuit (not illustrated). The control circuit may also generate (or contribute to generating) one or more of the control signals discussed above that drive the pixels 110A. Given a knowledge of the required pulse timings, a person of ordinary skill in the art would understand how to construct by conventional methods a control circuit that generates such pulses. Therefore, the pulse timings will be discussed in detail below, and the physical construction of the control circuit will be omitted. The flip-flops 440, OR gates 430, and multiplexors 420, work together to control a readout operation of the latches 410. Thus, the flip-flops 440, OR gates 430, and multiplexors 420 may be referred to herein and in the appended claims as a readout control circuitry of the parallel-to-serial readout circuitry 320. It will be understood, however, that the readout control circuitry discussed in this exemplary embodiment is merely one example, and that other configurations could be used. For example, any form of controlled switch may be used in place of the multiplexors 420, to select between the outputs of the ADC block 310 and the output of the next latch 410. As another example, alternative logic circuits could be substituted for the OR gates 430 that have equivalent truth tables, such as combinations of NAND and NOR gates. Furthermore, any circuit that sequentially enables the latches 410 can be substituted for the flip-flops 440—for example, the flip-flops 440 could be omitted and in their place separate enable pulses could be provided for each latch 410 by the control circuit at the appropriate timings. Furthermore, the illustrated connections between components are merely exemplary and could be modified. For example, instead of LOAD being connected to both the OR gates 430 and the multiplexors 420, separate control pulses may be provided for each.

[Operation of the First Exemplary Parallel-to-Serial Readout Circuitry]

Figure 5:
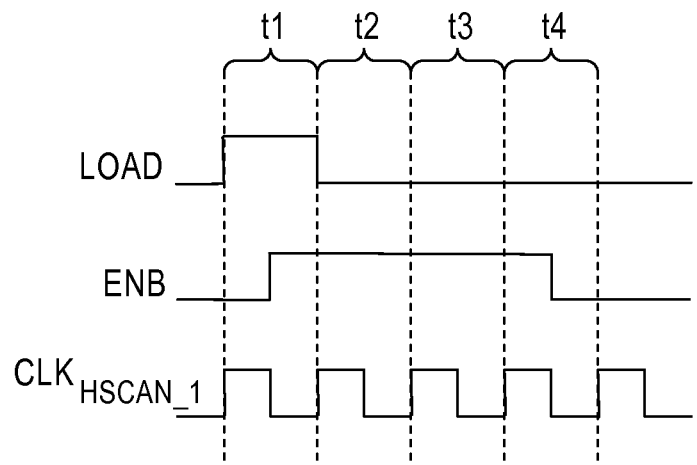
FIG. 5 is signal timing diagram illustrating signals controlling a readout operation of the first exemplary parallel-to-serial readout circuitry 320.
Figure 6:
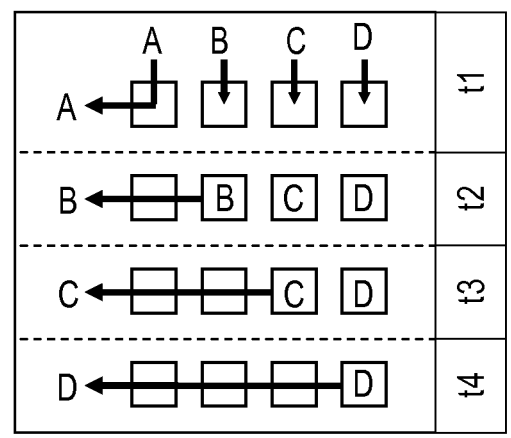
FIG. 6 is a conceptual diagram illustrating a readout operation of the first exemplary parallel-to-serial readout circuitry 320.

The function of the parallel-to-serial readout circuitry 320 of FIG. 4 will be explained with reference to FIGS. 5 and 6. FIG. 5 illustrates a timing diagram for the signals LOAD, ENB, and $CLK_{HSCAN\_1}$. FIG. 6 illustrates conceptually a readout flow of the latches $410_1$ through $410_4$ (represented by squares in the diagram) based on the signals shown in FIG. 5. As shown in FIG. 5, at a beginning of a first time period t1, the signal LOAD goes logical high. This causes the multiplexors $420_1$ through $420_3$ to select the bit output from the ADC blocks 310, and also enables the latches $410_1$ through $410_4$, causing them to read the bit values from the ADC blocks 310. In the conceptual diagram of FIG. 6, the bit values are represented by the numerals A through D, and as can be seen in the conceptual diagram, during time period t1 the bit values A through D are read into the latches $410_1$ through $410_4$, respectively, which means that the outputs Q of the latches $410_1$ through $410_4$ become the bit values A through D, respectively. Because the output Q of the first latch $410_1$ (i.e., bit value A) is connected to the data output line, the bit value A is propagated directly to the data output line essentially immediately upon LOAD going high. Thus, as shown in FIG. 6, in time period t1 the value A is read out through the latch $410_1$ and the values B, C, and D are read into the latches $410_2$, $410_3$, and $410_4$, respectively.

When LOAD goes low at the end of time period t1, the multiplexors $420_1$ through $420_3$ select the output of the next latch 410 instead of the bit output from the ADC blocks 310. For the remainder of the readout operation, the multiplexors $420_1$ through $420_3$ will remain in this configuration, essentially transparently passing the output Q of one latch 410 to the input D of the previous latch 410. Accordingly, further mention of the multiplexors 420 will be omitted.

Because LOAD is low from the start of time period t2 on, the latches $410_1$ through $410_3$ will no longer read their inputs D unless they are enabled by a high output from their corresponding flip-flop 440. In time period t2, the latch $410_1$ is enabled by its corresponding flip-flop $440_1$, while the latches $410_2$ and $410_3$ are not enabled by their flip-flops. Thus, the latch $410_1$ reads its input D (i.e., the output Q of the latch $410_2$, bit value B) during time period t2, and due to the transparent property of the latches 410 when enabled, the value B is propagated directly through latch $410_1$ to the data output line. Because the latches $410_2$ and $410_3$ are not enabled, they continue to output their previously output values—B and C, respectively—without reading the next latch 410's output. Thus, as shown in FIG. 6, the result is that in period t2 bit value B is read out to the data output line from latch $410_2$ through latch $410_1$, while bit values C and D are held in latches $410_3$ and $410_4$.

The reason that latch $410_1$ is enabled by its corresponding flip-flop $440_1$ in time period t2 is because at some point before the start of time period t2, the signal ENB goes high. This means that at the start of period t2 the signal ENB was logical high, causing the flip-flop $440_1$ to switch to outputting logical high throughout the remainder of period t2, which enables the latch $410_1$. The reason that latches $410_2$ and $410_3$ were not enabled during time period t2 is because at the start of time period t2, which is when the flip-flops read their inputs D, the outputs Q of the preceding flip-flops ($440_1$ and $440_2$) were low, causing the flip-flops $440_2$ and $440_3$ to output low throughout the remainder of time period 2. Even though flip-flop $410_1$ starts to output high right after the start of time period t2, the flip-flop $410_2$ still does not switch to outputting high during the time period t2, because the flip flops 440 read their inputs D only at precisely the start of the time period, and the output of flip-flop $440_1$ at the start of time period t2 was low (the output Q of the flip-flop $440_1$ does not switch to high until fractionally later than the start of time period t2). Thus, the flip-flop $440_2$ will not read the high value output by the flip-flop $440_1$ until the start of the next clock cycle.

In time period t3, the start of the next clock cycle causes flip-flop $440_2$ to switch to outputting high, since its input D at the start of the cycle (which is the output Q of the preceding flip-flop $440_1$) is high. This causes latch $440_2$ to become enabled, which means that latch $440_2$ will read the bit value C that is being asserted by the latch $440_3$, and latch $440_2$ will transparently propagate the bit value C directly to its output Q. Because latch $440_1$ remains enabled (ENB was high at the start of the period t3), when the bit value C appears on the output Q of latch $440_2$, latch $440_1$ reads the bit value C as well. Thus, as shown in FIG. 6, in time period t3 the bit value C is read out to the data output line from latch $410_3$ through latches $410_2$ and $410_1$, while the bit value D is held in the latch $410_4$.

In time period t4, the start of the next clock cycle causes flip-flop $440_3$ to switch to outputting high, since its input D at the start of the cycle (which is the output Q of the preceding flip-flop $440_2$) is high. This causes latch $440_3$ to become enabled, which means that latch $440_3$ will read the bit value D that is being asserted by the latch $440_4$, and latch $440_3$ will transparently propagate the bit value D directly to its output Q. Because latch $440_2$ remains enabled (the output Q of flip-flop $440_1$ was high at the start of the period t4), when the bit value D appears on the output Q of latch $440_3$, latch $440_2$ reads the bit value D and propagates the value to its output Q. Because latch $440_1$ remains enabled (ENB was high at the start of the period t4), when the bit value D appears on the output Q of latch $440_2$, latch $440_1$ reads the bit value D as well and propagates the value to its output Q. Thus, as shown in FIG. 6, in time period t4 the bit value D is read out to the data output line from latch $410_4$ through latches $410_3$, $410_2$, and $410_1$.

From this detailed discussion of the operation of the exemplary parallel-to-serial readout circuitry 320 of FIG. 4, a general pattern should become clear that is applicable to similar parallel-to-serial readout circuitries 320 having any number of latches 410. In particular, in a first time period the bit values from the ADC block 310 are read into the latches 410 of the parallel-to-serial readout circuitries 320 in parallel. The bit value of the first latch 410 is also read out at this time. The next time period, the first latch 410 is enabled and reads out the bit value of the second latch 410. Each subsequent time period, the next latch 410 becomes enabled, and the next bit value is read out through all of the previously enabled latches (which remain enabled until the readout is complete). This can be repeated for an arbitrary number of latches 410 until the bit value of the last latch 410 is read out.

As noted above, it is possible to include multiple parallel-to-serial readout circuitries 320. Furthermore, in such a case it would be possible to share some of the components between parallel-to-serial readout circuitries 320, thereby cutting down even further on power consumption and layout area. For example, each of the parallel-to-serial readout circuitries 320 may have its own set of latches 410, but a single set of flip-flops 440 may be provided that is shared in common by the parallel-to-serial readout circuitries 320. For example, a first latch $410_{1A}$ of a first parallel-to-serial readout circuitry 320 and a first latch $410_{1B}$ of a second parallel-to-serial readout circuitry 320 may both share a first flip-flop $440_1$. In this context, "share" means that the output Q of the first flip-flop Q would be connected to both the enable E of the first latch $410_{1A}$ and the enable E of the first latch $410_{1B}$ (through an OR gate 420). This type of configuration may be useful when a single digital pixel value (data word) is composed of multiple bits. In such a case, if the number of bits per data word is B, then B parallel-to-serial readout circuitries 320 may be provided that share flip-flops 440 such that there are B latches 410 for each data word (one latch 410 per bit), but only a single flip-flop 440 for each data word. In such a configuration, the first latch 410 of each of the parallel-to-serial readout circuitries 320 would correspond to one of the bits of a first data word, the second latch 410 of each of the parallel-to-serial readout circuitries 320 would correspond to one of the bits of a second data word, and so on. Thus, the first data word would be read out in the first time period (each bit being read out through one of the first latches 410 of the parallel-to-serial readout circuitries 320), the second data word would be read out in the second time period (each bit being read out through one of the second latches 410 of the parallel-to-serial readout circuitries 320), and so on.

[Advantages of the First Parallel-to-Serial Readout Circuitry]

The parallel-to-serial readout circuitry 320 of FIG. 4 has a number of advantages over other possible parallel-to-serial readout circuits. For example, the power consumption of such a parallel-to-serial readout circuitry 320 can be much lower than the power consumption of a conventional shift register or of a tri-state buffer/bus readout circuit. As another example, the layout area required by such parallel-to-serial readout circuitry 320 can be much lower than the layout area required by a conventional shift register or by a tri-state buffer/bus readout circuit. As another example, the difficulties associated with using a hybrid analog-digital architecture, which can arise in the tri-state buffer/bus readout circuit, are avoided by the parallel-to-serial readout circuitry 320 (which can operate entirely digitally).

The power consumption of the parallel-to-serial readout circuitry 320 of FIG. 4 will now be discussed in comparison to the power consumption of a shift register (which comprises a chain of flip-flops). During readout of the parallel-to-serial readout circuitry 320, only one flip-flop 440 and one latch 410 are toggled per clock cycle, with the other flip-flops 440 and latches 410 remaining in their previous state (except for a first clock cycle, in which all flip-flops 440 are reset and all latches 410 read down values). Thus, if the power associated with toggling a flip-flop 440 is $P_{ff}$ and if the power associated with toggling a latch 410 is $P_l$, then the power used by the parallel-to-serial readout circuitry 320 per clock cycle (excluding the first clock cycle) is:

$$P_{per\_clck} = P_{ff} + P_l \quad \text{(eq. 1)}$$

(equation 1 ignores power consumption due to transparent latches 410 and leakage power). It will take NB−1 clock cycles (excluding the first clock cycle) to read out the latches. During the first clock cycle in which pixel values are read down into the circuitry 320, each of the latches 410 is toggled and each of the flip-flops 440 is reset, and therefore the power consumption during the first cycle is:

$$P_{first\_clck} = NBP_{ff} + NBP_l \quad \text{(eq. 2)}$$

Thus, the total power consumed by the circuitry 320 is:

$$P_{first\_clck} + (NB-1)P_{per\_clck} = NB(P_{ff}+P_l) + (NB-1)(P_{ff}+P_l) = (P_{ff}+P_l)(2NB-1) \quad \text{(eq. 3)}$$

If it is assumed that $P_l \approx \frac{1}{2}P_{ff}$, then the total power consumption of the circuitry 320 becomes:

$$3NBP_{ff} - 3/2 P_{ff} \quad \text{(eq. 4)}$$

On the other hand, in the flip-flop based shift register, each flip-flop toggles every clock cycle, as the entire register shifts values. Thus, the power consumption of the flip-flop based shift register each cycle is $NBP_{ff}$, where N is the number of pixel signal values read out from the pixel array (e.g., the number of columns in the pixel array in many embodiments) and B is the number of bits per digital pixel value (data word). The shift register also consumes $NBP_{ff}$ to do the initial read down of the pixel values. Thus, the total power consumption for the shift register is:

$$(NB-1)(NBP_{ff}) + NBP_{ff} = N^2 B^2 P_{ff} \quad \text{(eq. 5)}$$

Thus, the ratio of power consumption of the flip-flop based shift register to the power consumption of the parallel-to-serial readout circuitry 320 is given by:

$$\frac{P_{circuitry\_320}}{P_{shift\_register}} = \frac{3NBP_{ff} - \frac{3}{2}P_{ff}}{N^2 B^2 P_{ff}} = \frac{3NB - \frac{3}{2}}{N^2 B^2} = \frac{3 - \frac{3}{2NB}}{NB} \quad \text{(eq. 6)}$$

For any reasonable value of NB, the ratio in equation 6 is less than 1, meaning that the circuitry 320 will always consume less power than the conventional shift register. Given that N is often on the order of hundreds or more, the ratio of power consumption in equation 6 becomes very small. For example, if N=504 and B=136, then the parallel-to-serial readout circuitry 320 will consume 0.004% as much power as the conventional shift register due to toggling latches/flip-flops. If the configuration discussed above in which B parallel-to-serial readout circuitries 320 are provided that share one set of flip flops is used, then the power consumption ratio becomes even smaller, since only N flip-flops 440 are used instead of N*B flip-flops. As noted, this power consumption estimation takes into account only power consumed by toggling flip-flops and latches, and does not take into account other forms of power consumption. However, other forms of power consumption are likely to be similar between the circuits, and thus the main difference in power consumption between the circuits will be in that attributable to toggling.

The layout area required when B parallel-to-serial readout circuitries 320 are provided that share a single set of flip-flops 440 will now be discussed in comparison to the layout area of a shift register (which comprises a chain of flip-flops). There will be NB latches 410 in this configuration (one for each bit of each data word), and N−1 flip-flops 440 (one for each data word except for the final data word). The layout area of each latch 410 ($S_l$) is approximately half the layout area of a flip-flop 440 ($S_{ff}$). Thus, the layout area required when B parallel-to-serial readout circuitries 320 are provided that share a single set of flip-flops 440 is:

$$NBS_l + (N-1)S_{ff} = NB\frac{S_{ff}}{2} + (N-1)S_{ff} = \left(\frac{B}{2}+1\right)NS_{ff} - S_{ff} \quad \text{(eq. 7)}$$

On the other hand, the layout area required by a shift register is approximately $NBS_{ff}$ (one flip-flop per bit of each data word). Thus, a ratio of the layout area required by the parallel-to-serial readout circuitries 320 to the layout area of the flip-flop based register is:

$$\frac{S_{circuitry\_320}}{S_{shift\_register}} = \frac{\left(\frac{B}{2}+1\right)NS_{ff}-S_{ff}}{NBS_{ff}} = \frac{\frac{B}{2}+1-\frac{1}{N}}{B} = \frac{1}{2}+\frac{1}{B}-\frac{1}{NB} \quad \text{(eq. 8)}$$

Thus, for any values of B greater than 2, the layout area of the parallel-to-serial readout circuitries 320 is smaller than the layout area of the flip-flop based register. If B is 136 and N is 504, then the ratio in layout area is approximately 0.51 (essentially half the layout area is required).

[Configuration of Second Exemplary Parallel-to-Serial Readout Circuitry]

Figure 7:
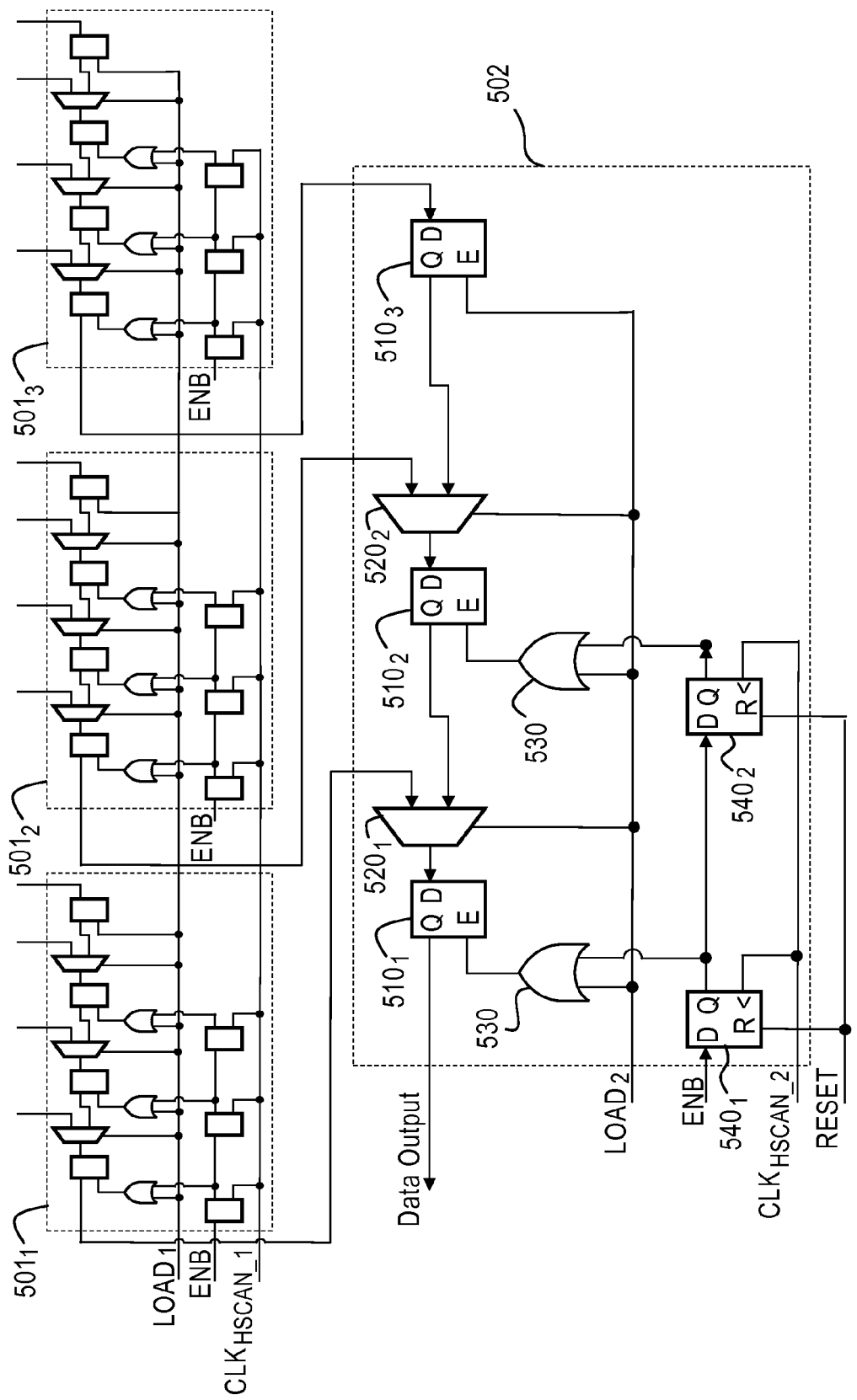
FIG. 7 is a circuit diagram illustrating a second exemplary parallel-to-serial readout circuitry 320.

FIG. 7 illustrates a second example of the parallel-to-serial readout circuitry 320. The parallel-to-serial readout circuitry 320 of FIG. 7 is composed of multiple circuits (501, 502) that are substantially similar to the parallel-to-serial readout circuitry 320 of FIG. 4, connected to each other in stages. For simplicity of discussion and to avoid confusion, the circuits (501, 502) will be referred to in this section as "latch registers". The word "register" is used in this label to allude to the function of converting parallel input data into serial output data, which is a function traditionally associated with a "shift register". However, it will be understood that this allusion to the function of converting parallel input data into serial output data in no way implies any other similarities or connections between the circuits (501, 502) and shift registers. In particular, the composition of the circuits (501, 502) is entirely different than that of a shift register, which comprises a chain of flip-flops. Furthermore, the operation of the circuits (501, 502) is entirely different than that of a shift register, which "shifts" values amongst each of its constituent flip flops each clock cycle.

In a first stage of the parallel-to-serial readout circuitry 320 of FIG. 7, multiple latch registers ($501_1$, $501_2$, and $501_3$) are provided. The latch registers $501_1$, $501_2$, and $501_3$ are each essentially identical to the parallel-to-serial readout circuitry 320 of FIG. 4, except that their output is connected to a next stage of the parallel-to-serial readout circuitry 320 instead of to the data output line. Because the components and operation of the latch registers $501_1$, $501_2$, and $501_3$ are essentially identical to those of the parallel-to-serial readout circuitry 320 of FIG. 4, further discussion of the components and operations of the latch registers $501_1$, $501_2$, and $501_3$ will be omitted.

The second stage of the parallel-to-serial readout circuitry 320 of FIG. 7 comprises a latch register 502, which is substantially similar to the parallel-to-serial readout circuitry 320 of FIG. 4, except that the inputs to the latches 510 come from the previous stage's latch registers 501 instead of from the ADC blocks 310, and the reset terminals of the flip-flops 540 in the latch register 502 are utilized in the readout operation. The latch register 502 will include one latch 510 for each latch register 501 that is included in the first stage. In particular, the output of latch register $501_1$ is input to the latch $510_1$ (via multiplexor $520_1$), the output of latch register $501_2$ is input to the latch $510_2$ (via multiplexor $520_2$), and the output of latch register $501_3$ is input to the latch $510_3$. The latch register 502 of the second stage utilizes a different clock ($CLK_{HSCAN\_2}$) and a different load signal ($LOAD_2$) than the latch registers 501 of the first stage ($CLK_{HSCAN\_1}$ and LOAN. The same enable signal ENB may be used in both the first and second stages. In practical circuits, it is important to coordinate the timing of the $LOAD_1$ and $LOAD_2$ signals so that the data in the accumulation registers inside the filter are properly propagated to the data output stage before the Data Output signal is latched. For example, $LOAD_1$ and $LOAD_2$ may be spread apart by one or more clock cycles.

In FIG. 7 there are three latch registers 501 in the first stage, and therefore latch register 502 includes three latches 510; however, it will be understood that FIG. 7 is merely exemplary, and that the number of latches 410 in each latch register 501 could be different than the number illustrated, and that the number of latch registers 501 in the first stage could be different that the number illustrated. Moreover, there could be multiple instances of the parallel-to-serial readout circuitry 320 of FIG. 7 provided for the pixel array 110, and the parallel-to-serial readout circuitries 320 may share some components in common (such as the flip-flops 410), in a manner similar to that discussed above with respect to the first exemplary parallel-to-serial readout circuitry 320 of FIG. 4. For example, if there are B bits per data word, then B parallel-to-serial readout circuitries 320 could be provided, one for each bit of each data word. The flip-flops 410 of the first stage could be shared by the first stage latch registers 501 of each of the parallel-to-serial readout circuitries, and the flip-flops 510 of the second stage could be shared by the second stage latch registers 502 of each of the parallel-to-serial readout circuitries.

The number of latch registers 501 to include in the first stage may be determined based on the physical properties and timing conditions of the device. In particular, although the latches 410 directly propagate the signals on their inputs D to their outputs Q, there is still some finite (albeit small) amount of time that it takes for the signal to propagate. Although the individual propagation times for each latch 410 are small, when a large number of such individual propagation times are combined, the total propagation time may become large enough to interfere with normal circuit operation. In particular, if the total time required to read out any latch exceeds the duration of a readout clock cycle, then the readout operation could fail. Some implementations of the parallel-to-serial readout circuitry 320 of FIG. 4 may be prone to such readout failure due to excessive propagation time. However, when the multiple stage-structure of the parallel-to-serial readout circuitry 320 of FIG. 7 is used, it may be possible to avoid such failures by appropriately setting the number of first-stage latch registers 501, as discussed in greater detail below.

Specifically, in the parallel-to-serial readout circuitry 320 of FIG. 4, the signal from an $n^{th}$ latch $410_n$ propagates through n-1 Latches as it is read out (except for the first latch, which passes through one latch), and if the propagation time per latch (including propagation along connecting wires and so on) is given by $\tau$, then the total time required to read out the $n^{th}$ latch, $T_n$, is given by $T_n = \tau(n-1)$ (except for the first latch, whose total propagation time is $\tau$). Thus, the first and second latches will have the shortest propagation times, namely $\tau$, while the last latch (the $N^{th}$ latch if there are N total latches) will have the longest propagation time, namely $T(N-1)$. In order to avoid any failure of readout, the maximum propagation time $T_{max} = \tau(N-1)$ is preferably less than the readout clock cycle $T_{CK}$. In some applications, when the parallel-to-serial readout circuitry 320 of FIG. 4 is implemented the number N may be very large, and it is possible in some applications that $\tau(N-1) < T_{CK}$ will not be satisfied. For example, in one application $T_{CK}$ equals 10 ns and $\tau \approx 0.5$ ns (i.e., $T_{CK} \approx 20\tau$), and N equals 504, which clearly does not satisfy the above-noted condition (since 503 ns ≮ 20 ns).

However, when the multiple stage-structure of the parallel-to-serial readout circuitry 320 of FIG. 7 is used, it is possible to avoid a readout error due to propagation time by dividing the total number of latches required for readout of the pixel array among multiple latch registers 501. This can avoid the readout error because the first stage latch registers 501 can begin the process of reading out a signal while the second stage latch register is concurrently in the process of reading out its signals (discussed in greater detail below). This means that it is no longer required that the first stage latch registers 501 have a maximum propagation time less than one clock cycle $T_{CK}$; instead, the first stage latch registers 501 merely need to have a maximum propagation time less than the amount of time it takes the second stage latch register 502 to read out all of its signals.

Specifically, since the second stage latch register 502 will read out one latch 510 per clock cycle, the total amount of time it takes to read out the entire second stage latch register 502 will be X clock cycles (i.e., $XT_{CK}$), where X equals the total number of latches 510 in the second stage (X also equals the total number of first stage latch registers 501). Thus, to avoid the readout error in the first stage latch registers 501, the maximum propagation time $T_{max}$ for each first stage latch register 501 should be less than $XT_{CK}$. When there are N values that need to be read out, then each first stage latch register 501 will have N/X latches, and therefore $T_{max} = \tau(N/X-1)$. Using this expression for $T_{max}$, it can be shown that the above-noted condition $T_{max} < XT_{CK}$ is satisfied when the following is true:

$$0 < X^2 T_{CK} + \tau X - \tau N \quad \text{(eq. 9)}$$

Equation 9 can be solved using the quadratic equation, resulting in the following:

$$\frac{-\tau + \sqrt{\tau^2 + 4T_{CK}\tau N}}{2T_{CK}} < X \quad \text{(eq. 10)}$$

However, since in most applications $\tau N/X$ is much greater than $\tau$, we can simplify the condition $T_{max} < XT_{CK}$ by using $T_{max} = \tau(N/X-1) \approx \tau N/X$, which reduces the condition $T_{max} < XT_{CK}$ to the following:

$$\sqrt{\frac{\tau N}{T_{CK}}} < X \quad \text{(eq. 11)}$$

If $\tau$, $T_{CK}$, and N are known, the minimum value of X that satisfies either equation 10 or equation 11 can be determined, which would indicate the minimum number of first stage latch registers 501 that should be included in the parallel-to-serial readout circuitry 320. Meeting either of these conditions should ensure that the first stage latch registers 501 have sufficient time to propagate their signals before the second stage latch register 502 finishes reading out its signals. Equation 11, which makes the simplifying assumption $T_{max} \approx \tau N/X$, is a slightly more conservative estimation, returning slightly higher values of X than equation 10. However, the difference in X returned by equations 10 and 11 is usually less than 1. It may be desirable in some applications to use the more conservative estimation, just to be doubly sure that sufficient propagation time is secured. In the exemplary application noted above in which $T_{CK} \approx 20\tau$ and N=504, the number of first stage latch registers 501 should be either greater than $$\sqrt{\frac{\tau N}{T_{CK}}} = \sqrt{25.2} \approx 5.01996$$

according to equation 11 or greater than $$\frac{-\tau + \sqrt{\tau^2 + 4T_{CK}\tau N}}{2T_{CK}} \approx 4.99502$$

according to equation 10. Thus, according to either equation 10 or 11, if at least six first stage latch registers 501 are included in the exemplary application, that would be sufficient to avoid the readout error.

Of course, the second stage latch register 502 also has propagation delay, and thus preferably a maximum propagation delay of the second stage latch register 502 is less than one clock cycle. However, because the second stage latch register 502 will have far fewer latches 510 than the first stage latch registers 501 have, this is generally not a problem. In particular, there will be X latches in the second stage latch register 502, and thus the maximum propagation delay of the second stage latch register 502 will be $\tau(X-1)$. From this it is apparent that increasing the number of first stage latch registers 501 (i.e., increasing X) increases the maximum propagation delay of the second stage. Thus, if too many first stage latch registers 501 are included, a read out error in the second stage may occur. Thus to avoid a readout error in the second stage $\tau(X-1)$ should be less than $T_{CK}$. This condition is satisfied when the following equation is true:

$$X < \frac{T_{CK}}{\tau} + 1 \quad \text{(eq. 12)}$$

Combining equations 11 and 12, we have approximate lower and upper bounds for the number of first stage latch registers 501 (i.e., X), given by:

$$\sqrt{\frac{\tau N}{T_{CK}}} < X < \frac{T_{CK}}{\tau} + 1 \qquad \text{(eq. 13)}$$

In the exemplary application noted above in which $T_{CK} \approx 20\,\tau$ and N=504, equation 13 yields upper and lower limits of approximately 5<X<21.

[Operation of the Second Exemplary Parallel-to-Serial Readout Circuitry]

Figure 8:
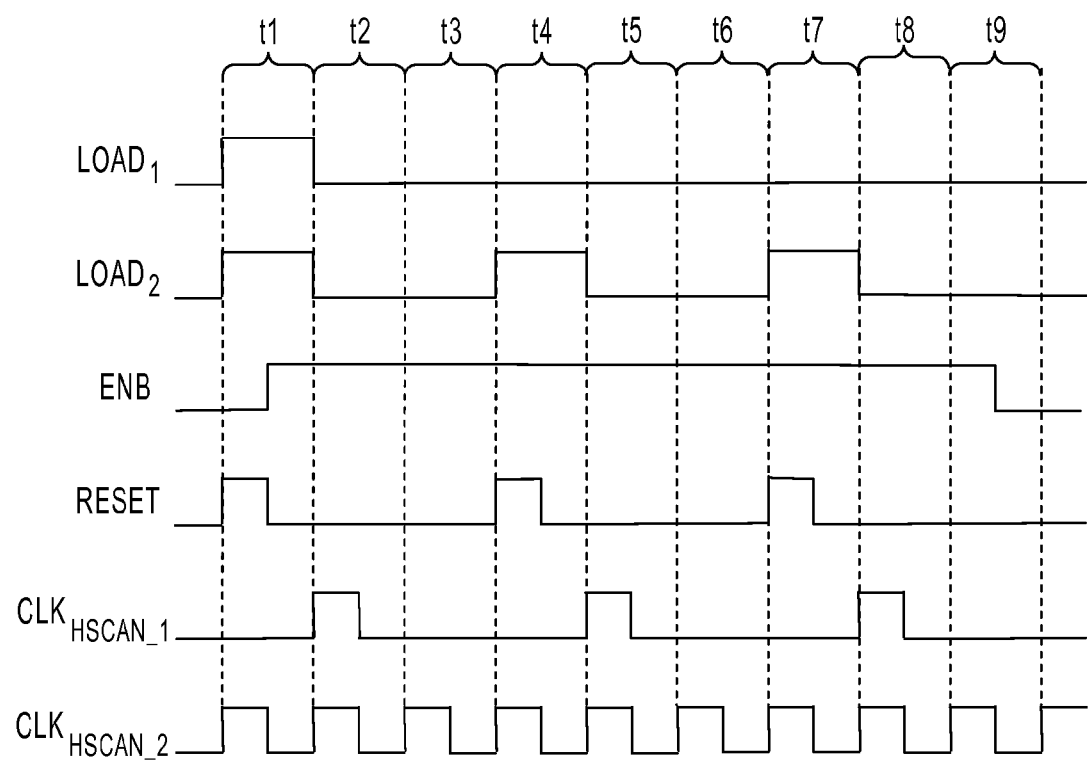
FIG. 8 is signal timing diagram illustrating signals controlling a readout operation of the second exemplary parallel-to-serial readout circuitry 320.
Figure 9:
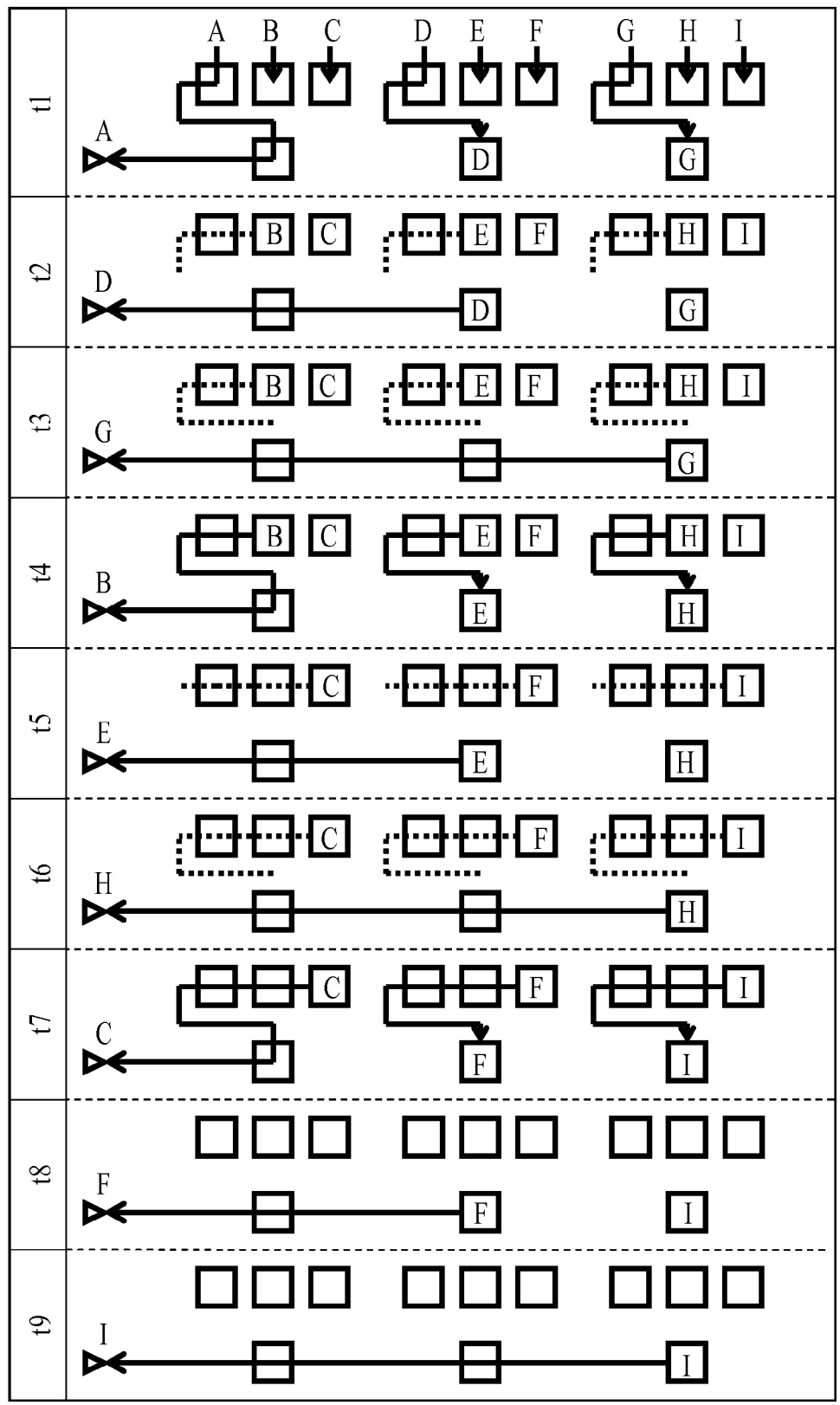
FIG. 9 is a conceptual diagram illustrating a readout operation of the second exemplary parallel-to-serial readout circuitry 320.

The operation of the second exemplary parallel-to-serial readout circuitry 320 of FIG. 7 will be explained with reference to FIGS. 8 and 9. FIG. 8 illustrates a timing diagram of the signals $LOAD_1$, $LOAD_2$, ENB, RESET, $CLK_{HSCAN\_1}$, and $CLK_{HSCAN\_2}$. In FIG. 8, the clock signal $CLK_{HSCAN\_1}$, has one-third the frequency of the clock signal $CLK_{HSCAN\_2}$. This is because there are three first stage latch registers 501. In general, the frequency of the clock signal $CLK_{HSCAN\_1}$ will be 1/X times the frequency of the clock signal $CLK_{HSCAN\_2}$, where X is the number of first-stage latch registers 501. In FIG. 9, the values read from the ADC blocks 310 are shown conceptually by the labels A through I, the first stage latches 410 are shown conceptually by the upper row of squares in each time period, and the second stage latches 510 are shown conceptually by the lower row of squares in each time period.

As shown in FIG. 8, in time period t1, $LOAD_1$ and $LOAD_2$ go high. This results in the values from the ADC blocks 310 being read down into the first stage (see FIG. 9, period t1—values A through I read down into first stage), and also results in the values of each first latch 410₁ in each of the first stage latch registers 501 being read down into the second stage (see FIG. 9, period t1—values A, D, and G read down into the second stage). The value of the first latch 510₁ of the second stage is also read out during the first time period, since the first latch 510₁ is transparent at this time (see FIG. 9, period t1—value A is read out). During time period t1 the RESET pulse is also asserted, ensuring that the flip-flops 540 of the second stage are reset to logical low. After this resetting of the flip-flops 540, the enable pulse ENB is set logical high, which allows the flip-flops 440 of the first stage and the flip-flops 540 of the second stage to operate thereafter according to their respective clock signals, as discussed above with respect to FIGS. 5 and 6.

In time period t2, $LOAD_2$ is released, and thus the multiplexor 520₁ causes the output Q of the second latch 510₂ of the second stage to be applied to the input D of the first latch 510₁ of the second stage. Because ENB was high when the clock pulse $CLK_{HSCAN\_2}$ occurred, the flip-flop 540₁ enables the first latch 510₁, and therefore the first latch 510₁ reads the output Q of the second latch 510₂. In other words, in time period t2, the value of second latch 510₂ of the second stage is output (see FIG. 9, period t2—value B is read out).

Similarly, in time period t2, $LOAD_1$ is also released, which results in the first latch 410₁ of each first stage latch register 501 reading the output of the second latch 410₂ (see FIG. 9, period t2—values B, E, and H begin horizontal readout), in the manner discussed with respect to FIGS. 5 and 6. Thus, the horizontal readout of the second value of the first stage begins at the same time that horizontal readout of the second value of the second stage beings.

In time period t3, the clock pulse $CLK_{HSCAN\_2}$ causes the second stage flip-flop 540₂ to output logical high, which enables the second latch 510₂ of the second stage to read the value of the third latch 510₃ of the second stage (see FIG. 9, period t3—value G read out of second stage).

In time period t4, the $LOAD_2$ signal goes high again, which causes the second stage latches 510 to read the output from the first stage (see FIG. 9, period t4—values B, E, and H are read down into second stage). The value of the first latch 510₁ of the second stage is also read out, since the first latch 510₁ is transparent at this time (see FIG. 9, period t4—value B read out). The second stage flip-flops 540 are also reset by the pulse RESET.

In time periods t5 and t6, the second stage values are read out in a manner similar to that already discussed above (see FIG. 9, period t5—value E read out; period t6—value H read out). Meanwhile, in periods t5 and t6, the values of each third latch 410₃ in the first stage begins propagating toward the second stage while the second stage values are being read out (see FIG. 9, periods t5 and t6—values C, F, and I begin horizontal read out in first stage).

In time period t7, the final values from the first stage are read down into the second stage, and in time periods t7 through t9 these values are then read out from the second stage (see FIG. 9, period t7—values C, F, and I read down into second stage; value C read out; period t8—value F readout out; period t9—value I read out).

Thus, it can be seen that by using the multiple stage structure of the parallel-to-serial readout circuitry 320 of FIG. 7, the first stage values can begin their propagation while the second stage values are being read out, which allows a greater time for these signals to propagate. In the example of FIGS. 8 and 9, the first stage signals get two clock cycles of $CLK_{HSCAN\_2}$ to propagate to their destination before the second stage attempts to read down the signals, instead of the one clock cycle maximum propagation time that would be allowed if multiple stages were not utilized.

[Advantages of the Second Parallel-to-Serial Readout Circuitry]

The parallel-to-serial readout circuitry 320 of FIG. 7 has a number of advantages over other possible parallel-to-serial readout circuits. Similar to the parallel-to-serial readout circuitry 320 of FIG. 4, the parallel-to-serial readout circuitry 320 of FIG. 7 has decreased power consumption and decreased layout area compared to other approaches, as well as avoiding the difficulties associated with using a hybrid analog-digital architecture. Furthermore, as already discussed above, the use of multiple stages in the parallel-to-serial readout circuitry 320 of FIG. 7 may provide the advantage in some applications of avoiding readout errors due to excessive propagation times.

The power consumption of the parallel-to-serial readout circuitry 320 of FIG. 7 is slightly more than the power consumption of the parallel-to-serial readout circuitry 320 of FIG. 4 (due to the additional stage), but is still substantially less than other approaches. In the parallel-to-serial readout circuitry 320 of FIG. 7, the power consumption due to toggling of each first stage latch register 501 will be $$\frac{3NB}{X}P_{\mathit{ff}} - \frac{3}{2}P_{\mathit{ff}},$$

and there are X first stage latch registers 501, so the power consumption of the first stage will be:

$$P_{first\_stage} = 3NBP_{ff} - \frac{3X}{2}P_{ff} \qquad \text{(eq. 13)}$$

The power consumption of the second stage for each readout cycle will be $$3XP_{ff} - \frac{3}{2}P_{ff},$$

and there will be NB/X second stage readout cycles, so the total power consumption of the second stage will be:

$$P_{second\_stage} = 3NBP_{ff}\left(1 - \frac{1}{2X}\right) \qquad \text{(eq. 14)}$$

Thus, the total power consumption of the parallel-to-serial readout circuitry 320 of FIG. 7 due to toggling is:

$$P_{circuitry\_320} = 3NBP_{ff}\left(2 - \frac{1}{2X}\right) - \frac{3X}{2}P_{ff}. \qquad \text{(eq. 15)}$$

Recall that the total power consumption for the shift register is $N^2B^2P_{ff}$. Thus, a ratio of the readout circuitry 320's power consumption to the shift registers power consumption is:

$$\frac{P_{circuitry\_320}}{P_{shift\_register}} = \frac{3NBP_{flip\text{-}flop}\left(2 - \frac{1}{2X}\right) - \frac{3X}{2}P_{flip\text{-}flop}}{N^2B^2P_{flip\text{-}flop}} = \qquad \text{(eq. 16)}$$

$$\frac{3NB\left(2 - \frac{1}{2X}\right) - \frac{3X}{2}}{N^2B^2} = \frac{6 - \frac{3}{2X} - \frac{3X}{2NB}}{NB}$$

For any reasonable values of N, B, and X, the ratio of equation 16 is much less than one (i.e., the power consumption of the readout circuitry 320 is much lower than that of the shift register). For example, if N=504, B=136, and X=6, then the ratio is 0.008%.

The layout area required when B parallel-to-serial readout circuitries 320 are provided that share a single set of flip-flops 440 will now be discussed in comparison to the layout area of a shift register (which comprises a chain of flip-flops). The layout area of the first stage latch registers 501 will be $$S_{ff}\left(\frac{BN}{2} + N - X\right).$$

The layout area of the second stage latch registers 502 will be $$S_{ff}\left(\frac{XB}{2} + X - 1\right).$$

Thus, the total layout area will be:

$$S_{circuitry\_320} = S_{ff}\left(\frac{BN}{2} + N + \frac{XB}{2} - 1\right) \qquad \text{(eq. 17)}$$

On the other hand, the total layout area of the shift register is $NBS_{flip\text{-}flop}$. Therefore, the ratio of the parallel-to-serial readout circuitries 320 to the shift registers is $$\frac{S_{circuitry\_320}}{S_{shift\_reg}} = \frac{S_{ff}\left(\frac{BN}{2} + N + \frac{XB}{2} - 1\right)}{NBS_{ff}} = \qquad \text{(eq. 18)}$$

$$\frac{\frac{BN}{2} + N + \frac{XB}{2} - 1}{NB} = \frac{1}{2} + \frac{1}{B} + \frac{X}{2N} - \frac{1}{NB}$$

Thus, for any reasonable values of B, X, and N, the ratio of equation 18 is lower than one (i.e., the layout area of the parallel-to-serial readout circuitries 320 is smaller than the layout area of the flip-flop based register). For large B and large N, the ratio approaches 0.5 (i.e., half the layout area is required). If B is 136, X is 6, and N is 504, then the ratio in layout area is approximately 0.51.

Interestingly, the total layout area of the parallel-to-serial readout circuitries 320 of FIG. 7 in which two stages are included is not dramatically more than the total layout area of the parallel-to-serial readout circuitries 320 of FIG. 4 in which only one stage is included. In particular, the layout area of the two-stage parallel-to-serial readout circuitries 320 is $1/2XBS_{ff}$ more than the layout area of the one stage parallel-to-serial readout circuitry 320. If B is 136, X is 6, and N is 504, the difference in layout area between the one-stage and two-stage parallel-to-serial readout circuitries 320 is only about 1.2%.

In addition, while only two stages are illustrated in FIG. 7, any arbitrary number of stages could be included. The output of each latch register of any given stage (except for the last stage) will be an input of a latch in the next stage, and the output of the last stage will be applied to the data output line.

Although the image sensor 100 was described above in assembled form, it will be understood that various components of the image sensor 100 might be manufactured/distributed separately (perhaps by different manufacturers) and then later combined (perhaps by a third manufacturer). For example, a pixel array unit 110 portion may be manufactured separately from a readout circuit 310.

Furthermore, the image sensor 110 may be included in numerous types of electronic devices, along with an optical system for focusing light on the image sensor. The optical system may comprise an objective lens that focuses the light so as to form an image on the image sensor. The optical system may further include zoom lenses, micro lens arrays, and other optical elements as well known in the art. For example, a digital camera may be provided with an image sensor 110 and an optical system. As another example, a smart phone may be provided with an image sensor 110 and an optical system. As another example, a personal computer may be provided with an image sensor 110 and an optical system.

In addition, although the exemplary parallel-to-serial readout circuitries 320 are discussed above as being part of an image sensor 100, it will be understood that they may be utilized in a variety of other electronic devices apart from image sensors, including personal computers, smart phones, smart watches, smart glasses, gaming consoles, etc. In fact, the exemplary parallel-to-serial readout circuitries 320 may be beneficially used in any device in which there is a need to convert parallel digital values into serial output values.

Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A parallel to serial readout circuitry, comprising:
a plurality of latches selectively connected to each other in series and to a plurality of data inputs in parallel, and
a readout control circuitry configured to control readout operations of the plurality of latches, including causing the plurality of latches to:
read values from the plurality of data inputs in parallel, and
output the values serially by sequentially enabling each of the plurality of latches.

2. The parallel to serial readout circuitry of claim 1, wherein the readout control circuitry includes:
a plurality of switches, each configured to switch an active connection of a corresponding one of the plurality of latches between one of the plurality of data inputs and between an output of another one of the plurality of latches, and
a plurality of flip-flops, each configured to enable a corresponding one of the plurality of latches based on a clock signal.

3. A parallel to serial readout circuitry comprising:
a plurality of latches selectively connected to each other in series and to a plurality of data inputs in parallel, and
a readout control circuitry including
a plurality of switches, each configured to switch an active connection of a corresponding one of the plurality of latches between one of the plurality of data inputs and between an output of another one of the plurality of latches,
a plurality of flip-flops, each configured to enable a corresponding one of the plurality of latches based on a clock signal, and
a plurality of logic circuits that are configured to output a logical disjunction of an output of a corresponding one of the plurality of flip-flops and a first control signal, the output of each of the plurality of logic circuits being connected to an enable input of a corresponding one of the plurality of latches, the readout control circuitry configured to control readout operations of the plurality of latches, including causing the plurality of latches to:
read values from the plurality of data inputs in parallel, and
output the values serially by sequentially enabling each of the plurality of latches, and,
wherein the first control signal also controls a switching operation of each of the plurality of switches.

4. The parallel to serial readout circuitry of claim 1, further comprising:
a second plurality of latches connected to each other in series and to a second plurality of data inputs in parallel, and
a second readout control circuitry configured to control readout operations of the second plurality of latches, including causing the second plurality of latches to:
read values from the second plurality of data inputs in parallel, and then
output the values serially by sequentially enabling each of the second plurality of latches,
wherein the readout control circuitry and the second readout control circuitry are configured to share in common a plurality of flip-flops, each configured to enable a corresponding one of the plurality of latches and a corresponding one of the second plurality of latches based on a clock signal.

5. A readout circuit, comprising:
a plurality of ADC blocks that convert a plurality of input analog signals to digital values and output in parallel bits of the digital values, and
the parallel to serial readout circuitry of claim 1, wherein the plurality of data inputs are connected to output lines of the plurality of ADC blocks and each of the read values is one of the bits that is output by the plurality of ADC blocks.

6. An image sensor, comprising:
a pixel array unit including a plurality of pixels that each include a photoelectric conversion element that converts incident light into an analog pixel signal, and
a readout circuit configured to read out analog pixel signals from the pixel array unit, wherein the readout circuit comprises:
a plurality of ADC blocks that convert the analog pixel signals into digital values and output in parallel bits of the digital values, and
the parallel to serial readout circuitry of claim 1, wherein the plurality of data inputs are connected to output lines of the plurality of ADC blocks and each of the read values is one of the bits that is output by the plurality of ADC blocks.

7. An electronic apparatus, comprising:
an optical device that focuses incident light;
a pixel array unit including a plurality of pixels that each include a photoelectric conversion element that converts light focused from the optical device into an analog pixel signal, and
a readout circuit configured to read out analog pixel signals from the pixel array unit, wherein the readout circuit comprises:
a plurality of ADC blocks that convert the analog pixel signals into digital values and output in parallel bits of the digital values, and
the parallel to serial readout circuitry of claim 1, wherein the plurality of data inputs are connected to output lines of the plurality of ADC blocks and each of the read values is one of the bits that is output by the plurality of ADC blocks.

8. A parallel to serial readout circuitry, comprising:
a plurality of first stage readout circuits, each including:
a plurality of latches selectively connected to each other in series and to a plurality of data inputs in parallel, and
a first-stage readout control circuitry configured to control readout operations of the plurality of latches of the respective first stage readout circuit, including causing the plurality of latches to:
read values from the plurality of data inputs in parallel, and then
output the values serially by sequentially enabling each of the plurality of latches; and
a second stage readout circuit including:
a second plurality of latches selectively connected to each other in series and to output lines of the plurality of first stage readout circuits in parallel, and a second-stage readout control circuitry configured to control readout operations of the second plurality of latches, including causing the second plurality of latches to:
    read values from the output lines of the plurality of first stage readout circuits in parallel, and then
    output the values serially by sequentially enabling each of the second plurality of latches.

9. The parallel to serial readout circuitry of claim 8, wherein at least the second-stage readout control circuitry includes:
    a plurality of switches, each configured to switch an active connection of a corresponding one of the plurality of latches of the second stage readout circuit between one of the plurality of data inputs and between an output of another one of the plurality of latches, and
    a plurality of flip-flops, each configured to enable a corresponding one of the plurality of latches of the second stage readout circuit based on a clock signal.

10. The parallel to serial readout circuitry of claim 9, wherein the second-stage readout control circuitry further includes a plurality of logic circuits that are configured to output a logical disjunction of an output of a corresponding one of the plurality of flip-flops and a first control signal, the output of each of the plurality of logic circuits being connected to an enable input of a corresponding one of the plurality of latches of the second stage readout circuit,
    wherein the first control signal also controls a switching operation of each of the plurality of switches.

11. The parallel to serial readout circuitry of claim 8, further comprising, for each of the plurality of first stage readout circuits:
    the second plurality of latches connected to each other in series and to a second plurality of data inputs in parallel, and
    a second readout control circuitry configured to control readout operations of the second plurality of latches, including causing the second plurality of latches to:
        read values from the second plurality of data inputs in parallel, and then
        output the values serially by sequentially enabling each of the second plurality of latches,
    wherein, for each of the plurality of first stage readout circuits, the first-stage readout control circuitry and the second-stage readout control circuitry are configured to share in common a plurality of flip-flops, each configured to enable a corresponding one of the plurality of latches and a corresponding one of the second plurality of latches based on a clock signal.

12. The parallel to serial readout circuitry of claim 8, wherein a total number of all first stage readout circuits, including the plurality of first stage readout circuits, that are connected to the second stage readout circuit is greater than $$\sqrt{\frac{\tau N}{T_{CK}}}$$

and less than $$\frac{T_{CK}}{\tau} + 1,$$

where $\tau$ is an average per-latch propagation delay of the plurality of latches of each of the first stage readout circuits, N is a total number of latches included in all of the first stage readout circuits that are connected to the second stage readout circuit, and $T_{CK}$ is a duration of a clock cycle of a readout clock, where values are read out serially from the second stage readout circuit at a rate of once per the clock cycle of the readout clock.

13. The parallel to serial readout circuitry of claim 8, wherein a total number of all first stage readout circuits, including the plurality of first stage readout circuits, that are connected to the second stage readout circuit is greater than $$\sqrt{\frac{(0.5 \text{ ns})N}{T_{CK}}}$$

and less than $$\frac{T_{CK}}{0.5 \text{ ns}} + 1,$$

where N is a total number of latches included in all of the first stage readout circuits that are connected to the second stage readout circuit, and $T_{CK}$ is a duration of a clock cycle of a readout clock, where values are read out serially from the second stage readout circuit at a rate of once per the clock cycle of the readout clock.

14. The parallel to serial readout circuitry of claim 8, wherein a total number of all first stage readout circuits, including the plurality of first stage readout circuits, that are connected to the second stage readout circuit is greater than $$\sqrt{\frac{N}{20}}$$

and less than 21, where N is a total number of latches included in all of the first stage readout circuits that are connected to the second stage readout circuit.

15. A readout circuit, comprising:
    a plurality of ADC blocks that convert a plurality of input analog signals to digital values and output in parallel bits of the digital values, and
    the parallel to serial readout circuitry of claim 8, wherein, for each of the plurality of first stage readout circuits, the plurality of data inputs are connected to the output lines of the plurality of ADC blocks and each of the read values is one of the bits that is output by the plurality of ADC blocks.

16. An image sensor, comprising:
    a pixel array unit, comprising a plurality of pixels that each include a photoelectric conversion element that converts incident light into an analog pixel signal, and
    a readout circuit configured to read out analog pixel signals from the pixel array unit, wherein the readout circuit comprises:
        a plurality of ADC blocks that convert the analog pixel signals into digital values and output in parallel bits of the digital values, and the parallel to serial readout circuitry of claim 8, wherein, for each of the plurality of first stage readout circuits, the plurality of data inputs are connected to the output lines of the plurality of ADC blocks and each of the read values is one of the bits that is output by the plurality of ADC blocks.

17. An electronic apparatus, comprising:
an optical device that focuses incident light;
a pixel array unit, comprising a plurality of pixels that each include a photoelectric conversion element that converts light focused from the optical device into an analog pixel signal, and
a readout circuit configured to read out analog pixel signals from the pixel array unit, wherein the readout circuit comprises:
   a plurality of ADC blocks that convert the analog pixel signals into digital values and output in parallel bits of the digital values, and
   the parallel to serial readout circuitry of claim 8, wherein, for each of the plurality of first stage readout circuits, the plurality of data inputs are connected to the output lines of the plurality of ADC blocks and each of the read values is one of the bits that is output by the plurality of ADC blocks.

18. A method of controlling a parallel to serial readout circuitry that includes a plurality of latches selectively connected to each other in series and to a plurality of data inputs in parallel the method comprising:
   reading values from the plurality of data inputs into the plurality of latches in parallel, by enabling each of the plurality of latches simultaneously, and
   outputting the values from the plurality of latches serially by sequentially enabling each of the plurality of latches.

19. A method of controlling a parallel to serial readout circuitry that includes a plurality of latches selectively connected to each other in series and to a plurality of data inputs in parallel, a plurality of switches, each configured to switch an active connection of a corresponding one of the plurality of latches between one of the plurality of data inputs and between an output of another one of the plurality of latches, and a plurality of flip-flops, each with an output connected to an enable input of a corresponding one of the plurality of latches, the method comprising:
   reading values from the plurality of data inputs into the plurality of latches in parallel, by enabling each of the plurality of latches simultaneously;
   outputting the values from the plurality of latches serially by sequentially enabling each of the plurality of latches;
   controlling each of the plurality of switches to select one of the plurality of data inputs while performing said reading values from the plurality of data inputs into the plurality of latches in parallel;
   controlling each of the plurality of switches to select the output of one of the plurality of latches while performing said outputting the values from the plurality of latches serially; and
   generating an enable signal and a clock signal at timings that cause the plurality of flip-flops to sequentially output enabling signals, thereby effectuating said sequentially enabling each of the plurality of latches.

20. The method of claim 18, wherein said outputting the values from the plurality of latches serially includes, as each of the plurality of latches becomes enabled by said sequentially enabling each of the plurality of latches, maintaining each enabled latch in an enabled state until all of the plurality of latches have been enabled.

21. The method of claim 18, wherein the plurality of latches are asynchronous.

22. The parallel to serial readout circuitry of claim 1, wherein the plurality of latches are asynchronous.

* * * * *